US012784965B2

(12) United States Patent
Honda et al.

(10) Patent No.: US 12,784,965 B2
(45) Date of Patent: Nov. 3, 2026

(54) COIL COMPONENT AND MANUFACTURING METHOD FOR COIL COMPONENT

(71) Applicant: Murata Manufacturing Co., Ltd., Kyoto-fu (JP)

(72) Inventors: Hiroyuki Honda, Nagaokakyo (JP); Katsuyuki Takahashi, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 750 days.

(21) Appl. No.: 18/323,361

(22) Filed: May 24, 2023

(65) Prior Publication Data

US 2024/0013969 A1 Jan. 11, 2024

(30) Foreign Application Priority Data

Jul. 6, 2022 (JP) ................................ 2022-109261

(51) Int. Cl.
*H01F 27/29* (2006.01)
*H01F 27/28* (2006.01)
*H01F 27/30* (2006.01)

(52) U.S. Cl.
CPC ......... *H01F 27/29* (2013.01); *H01F 27/2828* (2013.01); *H01F 27/306* (2013.01)

(58) Field of Classification Search
CPC .... H01F 27/29; H01F 27/2828; H01F 27/306; H01F 2017/0093; H01F 27/292; H01F 27/263; H01F 17/045; H01F 27/266; H01F 27/02; H01F 41/04; H01F 27/24; H01F 3/10; H01F 27/2823
(Continued)

(56) References Cited

U.S. PATENT DOCUMENTS

2008/0224813 A1* 9/2008 Hirai .................... H01F 17/045 336/216
2009/0195342 A1* 8/2009 Azuma ................ H01F 27/361 336/192
(Continued)

FOREIGN PATENT DOCUMENTS

JP 2018-78155 A 5/2018
JP 2018-152576 A 9/2018
(Continued)

*Primary Examiner* — Kenneth Whittington
(74) *Attorney, Agent, or Firm* — Studebaker Brackett PLLC

(57) ABSTRACT

A coil component includes a core having a core portion extending in an axial direction, and first and second flange portions respectively provided at both ends of the core portion in the axial direction, a coil wound around the core portion, and a top plate which spans between the first flange portion and the second flange portion. The first flange portion has a first facing surface facing the top plate. The top plate has a second facing surface facing the first flange portion. In a cross section that is orthogonal to the axial direction and intersects with the first flange portion, a protruding portion having a convex shape and convex toward the top plate is on the first facing surface, and a recessed portion having a concave shape and complementing the convex shape of the protruding portion of the first flange portion is on the second facing surface.

20 Claims, 9 Drawing Sheets

(58) Field of Classification Search
USPC ..... 336/83, 90, 96, 208, 213, 225, 233, 212, 336/216
See application file for complete search history.

(56) References Cited

U.S. PATENT DOCUMENTS

| | | | | |
|---|---|---|---|---|
| 2019/0088400 | A1* | 3/2019 | Kanbe | H01F 27/263 |
| 2019/0156990 | A1* | 5/2019 | Igarashi | H01F 27/263 |
| 2020/0203070 | A1* | 6/2020 | Takahashi | H01F 3/10 |
| 2022/0102053 | A1* | 3/2022 | Nakashima | H01F 27/26 |
| 2023/0135284 | A1* | 5/2023 | Takayama | H01F 27/29<br>336/192 |
| 2023/0386725 | A1* | 11/2023 | Marusawa | H01F 27/263 |

FOREIGN PATENT DOCUMENTS

| | | | |
|---|---|---|---|
| JP | 2020-102559 | A | 7/2020 |
| JP | 2021-145054 | A | 9/2021 |
| JP | 2022-54272 | A | 4/2022 |
| WO | 2007/060961 | A1 | 5/2007 |

* cited by examiner

COIL COMPONENT AND MANUFACTURING METHOD FOR COIL COMPONENT

CROSS-REFERENCE TO RELATED APPLICATION

This application claims benefit of priority to Japanese Patent Application No. 2022-109261, filed Jul. 6, 2022, the entire content of which is incorporated herein by reference.

BACKGROUND

Technical Field

The present disclosure relates to a coil component and a manufacturing method for a coil component.

Background Art

Hitherto, Japanese Unexamined Patent Application Publication No. 2018-152576 describes a coil component. The coil component includes a core, a coil, and a top plate. The coil has a core portion extending in an axial direction, and a first flange portion and a second flange portion respectively provided at both ends of the core portion in the axial direction. The coil is wound around the core portion. The top plate is provided to span between the first flange portion and the second flange portion.

Incidentally, Japanese Unexamined Patent Application Publication No. 2018-152576 describes that each of the upper surface of the first flange portion and the upper surface of the second flange portion in a height direction of the coil component is a flat surface. However, the inventors actually manufactured a core and a top plate by powder compact molding and found the following challenges.

It was found that, since the core had a complicated structure including the first flange portion, the second flange portion, and the core portion, an extremely small protruding portion was easy to occur on each of the upper surface of the first flange portion and the upper surface of the second flange portion. On the other hand, the top plate had a sheet shape and did not have a complicated structure, so it was easy to form the bottom surface of the top plate in a flat surface.

Therefore, when a coil component was manufactured by combining a core with a top plate, a distance between the upper surface of the first flange portion and the bottom surface of the top plate or the upper surface of the second flange portion and the bottom surface of the top plate or both were sometimes greater than a desired distance. As a result, it was found that the magnetic reluctance of those portions increased and, therefore, coil characteristics could deteriorate.

SUMMARY

The present disclosure provides a coil component capable of improving coil characteristics.

An aspect of the present disclosure provides a coil component. The coil component includes a core having a core portion extending in an axial direction, and a first flange portion and a second flange portion respectively provided at both ends of the core portion in the axial direction, a coil wound around the core portion, and a top plate provided so as to span between the first flange portion and the second flange portion. The first flange portion has a first facing surface facing the top plate. The top plate has a second facing surface facing the first flange portion. In a cross section that is orthogonal to the axial direction and that intersects with the first flange portion, a protruding portion having a convex shape and convex toward the top plate is provided on the first facing surface, and a recessed portion having a concave shape and complementing the convex shape of the protruding portion of the first flange portion is provided on the second facing surface.

According to the aspect, since the convex shape of the protruding portion provided at the first flange portion complements the concave shape of the recessed portion provided at the top plate, a distance between a top plate-side facing surface and a first flange portion-side facing surface is reduced as compared to when a core having a protruding portion on an upper surface of a first flange portion is combined with a top plate having a flat bottom surface. As a result, magnetic reluctance that is generated by a space between the top plate-side facing surface and the first flange portion-side facing surface is reduced, with the result that coil characteristics are improved.

Preferably, in one embodiment of the coil component, the top plate has a top surface on an opposite side to the second facing surface, and in the cross section, a topmost part of the protruding portion of the first flange portion is disposed at a center of the first flange portion in a direction parallel to the top surface of the top plate.

According to the embodiment, even when the first flange portion is disposed so as to be shifted with respect to the top plate in a direction orthogonal to the axial direction and parallel to the top surface of the top plate, a distance between the top plate-side facing surface and the first flange portion-side facing surface is further reliably reduced at a topmost part of the protruding portion in a direction orthogonal to the top surface of the top plate.

Preferably, in one embodiment of the coil component, the top plate has a top surface on an opposite side to the second facing surface, and in the cross section, where a direction from the core toward the top plate is an upper side, (i) a topmost part of an inner surface of the recessed portion, (ii) a topmost part of the protruding portion, and (iii) at least one of both end parts of the recessed portion in a direction parallel to the top surface of the top plate are disposed in this order from the top plate side.

According to the embodiment, a distance between the second facing surface and the first facing surface is further reliably reduced in a direction orthogonal to the axial direction and parallel to the top surface of the top plate.

Preferably, in one embodiment of the coil component, the top plate has a top surface on an opposite side to the second facing surface. When viewed in a direction orthogonal to the top surface of the top plate, the protruding portion and the recessed portion, respectively, have regions that are parts overlapping each other, and, in the cross section, a distance between the protruding portion and the recessed portion at each of both end parts of each of the regions that are the overlapping parts in a direction parallel to the top surface of the top plate is greater than a distance between the protruding portion and the recessed portion at a center of each of the regions that are the overlapping parts in the direction parallel to the top surface of the top plate.

According to the embodiment, a distance between the second facing surface and the first facing surface is further reliably reduced at the center of each of the regions that are the overlapping parts in the direction orthogonal to the axial direction and parallel to the top surface of the top plate.

Preferably, in one embodiment of the coil component, the top plate has a top surface on an opposite side to the second facing surface, and a bottom surface on an opposite side to the top surface and having the second facing surface. Also, the bottom surface of the top plate has a cutout in at least one of both end parts in a direction orthogonal to the axial direction and parallel to the top surface of the top plate.

According to the embodiment, since the top plate has a cutout, adhesive can be guided and stored in the cutout when the core and the top plate are bonded with the adhesive. Therefore, even when the amount of adhesive is excessive, it is possible to reduce squeeze-out of adhesive to outside the coil component.

Preferably, in one embodiment of the coil component, in the cross section, where a direction from the core toward the top plate is an upper side, a topmost part of an inner surface of the cutout, a topmost part of an inner surface of the recessed portion, a topmost part of the protruding portion, and one or both end parts of the recessed portion, provided with the cutout, in a direction parallel to the top surface of the top plate are disposed in this order from the top plate side.

According to the embodiment, since the size of the cutout is increased, it is possible to guide and store a larger amount of adhesive into the cutout, so squeeze-out of adhesive to outside the coil component is further reliably reduced.

Preferably, in one embodiment of the coil component, when viewed in a direction orthogonal to the top surface of the top plate, the cutout overlaps the protruding portion of the first flange portion.

According to the embodiment, in comparison with a case where the cutout does not overlap the protruding portion of the first flange portion, leakage of adhesive from the end part of the recessed portion in the direction orthogonal to the axial direction and parallel to the top surface of the top plate to outside the coil component is reduced, so adhesive is further reliably guided to the cutout.

Preferably, in one embodiment of the coil component, the top plate has a top surface on an opposite side to the second facing surface, and a bottom surface on an opposite side to the top surface and having the second facing surface, and the recessed portion of the top plate extends to a region overlapping the core portion in the bottom surface of the top plate when viewed in a direction orthogonal to the axial direction and orthogonal to the top surface of the top plate.

According to the embodiment, even when the first flange portion is disposed so as to be shifted with respect to the top plate toward the region overlapping the core portion, a distance between the second facing surface and the first facing surface is reduced, so coil characteristics are improved.

Preferably, in one embodiment of the coil component, in the cross section, a radius of curvature of the recessed portion of the top plate is greater than a radius of curvature of the protruding portion of the first flange portion.

According to the embodiment, in comparison with a case where the radius of curvature of the recessed portion of the top plate is less than the radius of curvature of the protruding portion of the first flange portion, a distance between the top plate-side facing surface and the first flange portion-side facing surface is further reliably reduced at the topmost part of the protruding portion in the direction orthogonal to the top surface of the top plate.

Preferably, in one embodiment of the coil component, in the cross section, a center of a circle of curvature of the recessed portion of the top plate is located outside the first flange portion.

According to the embodiment, in comparison with a case where the center of the circle of curvature of the recessed portion of the top plate is located inside the first flange portion, the radius of curvature of the recessed portion of the top plate is increased. Thus, it is easy to control the depth of the recessed portion at the time of molding the top plate, so variations in the depth of the recessed portion are reduced. As a result, variations in coil characteristics are also reduced.

Preferably, in one embodiment of the coil component, in the cross section, a center of a circle of curvature of the protruding portion of the first flange portion is located outside the first flange portion.

According to the embodiment, in comparison with a case where the center of the circle of curvature of the protruding portion of the first flange portion is located inside the first flange portion, the radius of curvature of the protruding portion of the first flange portion is increased. Thus, it is easy to control the height of the protruding portion at the time of molding the core, so variations in the height of the protruding portion are reduced. As a result, variations in coil characteristics are also reduced.

Preferably, in one embodiment of the coil component, the coil component further includes an adhesive bonding the core with the top plate, wherein the adhesive contains magnetic particles.

According to the embodiment, since the adhesive contains magnetic particles, coil characteristics are improved as compared to when the adhesive does not contain magnetic particles.

In one embodiment of a manufacturing method for a coil component, the manufacturing method includes forming a core having a protruding portion in a first flange portion by forming a core molded body through first press molding of a core material and then firing the core molded body, forming a top plate having a recessed portion by forming a top plate molded body through second press molding of a top plate material and then firing the top plate molded body, winding a coil around a core portion of the core, and combining the top plate with the core in which the coil is wound.

According to the embodiment, it is possible to manufacture a coil component capable of improving coil characteristics.

Preferably, in one embodiment of the manufacturing method for a coil component, the first press molding is to compress the core molded body with an upper punch and a lower punch.

According to the embodiment, the protruding portion is easily formed in the first flange portion of the core.

Preferably, in one embodiment of the manufacturing method for a coil component, the second press molding is to compress the top plate molded body with an upper punch and a lower punch.

According to the embodiment, the top plate molded body is easily manufactured.

An aspect of the present disclosure provides a coil component. The coil component includes a core having a core portion extending in an axial direction, and a first flange portion and a second flange portion respectively provided at both ends of the core portion in the axial direction, a coil wound around the core portion, and a top plate provided so as to span between the first flange portion and the second flange portion. The first flange portion has a first facing surface facing the top plate. The top plate has a second facing surface facing the first flange portion. In a cross section that is orthogonal to the axial direction and that intersects with the first flange portion, a protruding portion having a convex shape and convex toward the first flange portion when viewed in the axial direction is provided on the second facing surface, and a recessed portion having a concave shape and complementing the convex shape of the protruding portion of the top plate is provided on the first facing surface.

According to the aspect, since the convex shape of the protruding portion provided at the top plate complements the concave shape of the recessed portion provided at the first flange portion, a distance between a top plate-side facing surface and a first flange portion-side facing surface is reduced as compared to when a core having a protruding portion on an upper surface of a first flange portion is combined with a top plate having a flat bottom surface. As a result, magnetic reluctance that is generated by a space between the top plate-side facing surface and the first flange portion-side facing surface is reduced, with the result that coil characteristics are improved.

DETAILED DESCRIPTION

Figure 1:
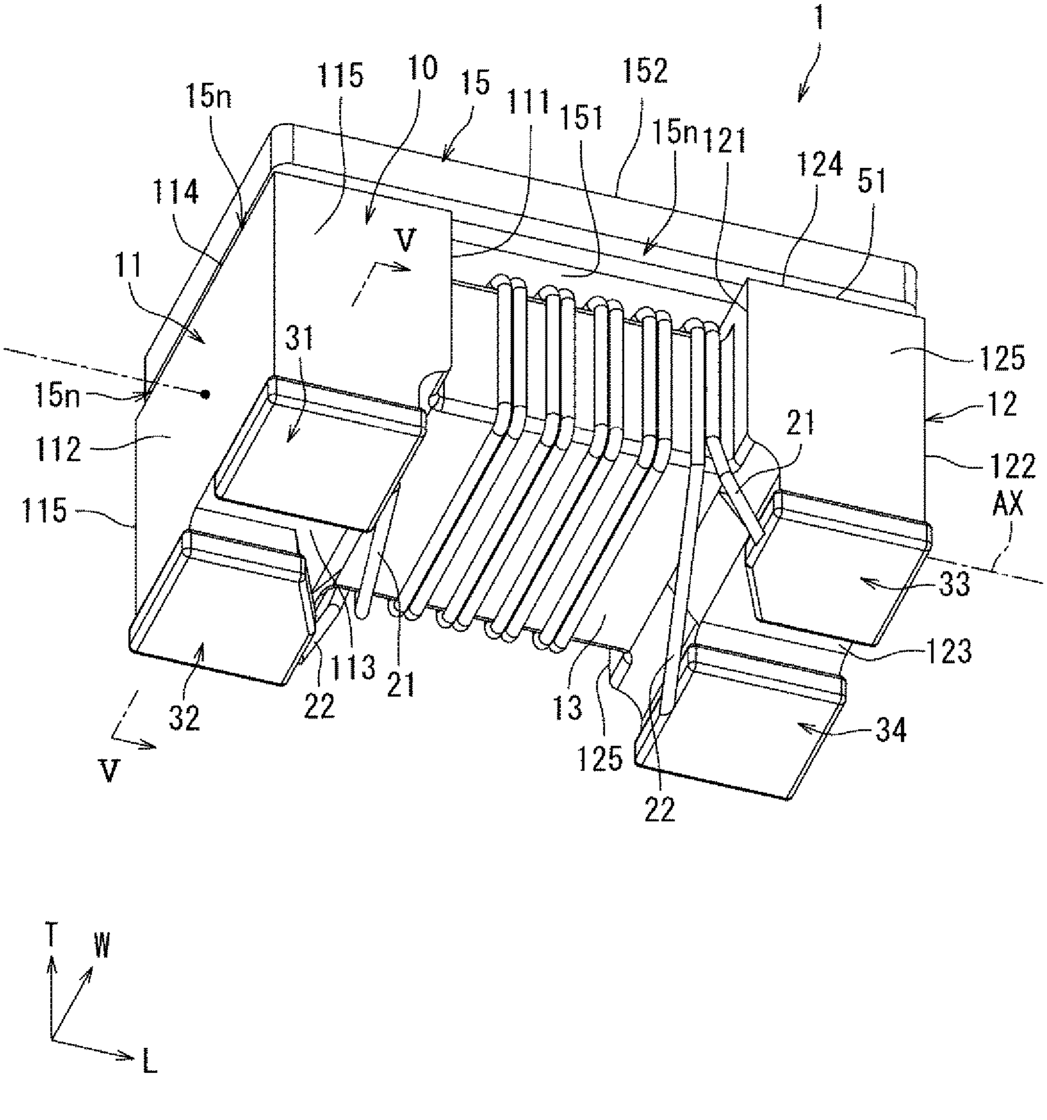
FIG. 1 is a perspective view of a first embodiment of a coil component when viewed from a lower side.

Hereinafter, a coil component and a manufacturing method for a coil component according to the aspect of the present disclosure will be described in detail with reference to the embodiments shown in the drawings. The drawings include partially schematic ones and possibly do not reflect actual sizes or ratios.

First Embodiment

Overall Configuration

FIG. 1 is a perspective view of a first embodiment of a coil component when viewed from a lower side. As shown in FIG. 1, the coil component 1 includes a core 10, a first wire 21 and a second wire 22 wound around the core 10, a first terminal electrode 31, a second terminal electrode 32, a third terminal electrode 33, and a fourth terminal electrode 34 to which the first wire 21 and the second wire 22 provided on the core 10 are electrically connected, and a top plate 15 attached to the core 10. The first wire 21 and the second wire 22 correspond to "a coil" described in the appended claims.

The core 10 has a core portion 13 extending in an axis AX direction, and a first flange portion 11 and a second flange portion 12 respectively provided at both ends of the core portion 13 in the axis AX direction. More specifically, the core 10 has the core portion 13 having a shape extending in the axis AX direction and around which the first wire 21 and the second wire 22 are wound, the first flange portion 11 provided at a first end of the core portion 13 in the axis AX direction and extending in a direction orthogonal to the axis AX direction, and the second flange portion 12 provided at a second end of the core portion 13 in the axis AX direction and extending in the direction orthogonal to the axis AX direction.

Although the shape of the core portion 13 is not limited, the shape of the core portion 13 in cross section orthogonal to the axis AX direction is a rectangular shape in the embodiment. The shape of the cross section may be another polygonal shape, such as a hexagonal shape, a circular shape, an elliptical shape, or a shape obtained by combining some of these shapes as needed. The material of the core 10 is preferably, for example, a sintered body of ferrite, a magnetic substance, such as a molded body of a resin containing magnetic particles, and may be alumina or a non-magnetic substance, such as a resin.

Hereinafter, the bottom surface of the core 10 is defined as a surface to be mounted on a mounting substrate, and a surface on an opposite side of the bottom surface of the core 10 is defined as the top surface of the core 10. The axis AX direction of the core portion 13 is defined as an L direction, a direction orthogonal to the L direction at the bottom surface of the core 10 is defined as a W direction, and a direction in which the bottom surface and the top surface of the core 10 are opposed to each other is defined as a T direction. The T direction is orthogonal to the L direction and the W direction. A positive side of the T direction is defined as an upper side, and a negative side of the T direction is defined as a lower side. In other words, the bottom surface of the core 10 corresponds to a lower side in a vertical direction, and the top surface of the core 10 corresponds to an upper side in the vertical direction. The L direction is also referred to as a length direction of the core 10, the W direction is also referred to as a width direction of the core 10, and the T direction is also referred to as a height direction of the core 10. The W direction corresponds to "a direction orthogonal to an axial direction and parallel to a top surface of a top plate" described in the appended claims. The T direction corresponds to "a direction orthogonal to the top surface of the top plate" described in the appended claims.

The first flange portion 11 has an inner end surface 111 facing toward the core portion 13, an outer end surface 112 facing toward an opposite side to the inner end surface 111, a lower surface 113 coupling the inner end surface 111 to the outer end surface 112 and faced toward the mounting substrate at the time of mounting, an upper surface 114 facing toward an opposite side to the lower surface 113, and two side surfaces 115 coupling the inner end surface 111 to the outer end surface 112 and coupling the lower surface 113 to the upper surface 114.

The second flange portion 12 has an inner end surface 121 facing toward the core portion 13, an outer end surface 122 facing toward an opposite side to the inner end surface 121, a lower surface 123 coupling the inner end surface 121 to the outer end surface 122 and faced toward the mounting substrate at the time of mounting, an upper surface 124 facing toward an opposite side to the lower surface 123, and two side surfaces 125 coupling the inner end surface 121 to the outer end surface 122 and coupling the lower surface 123 to the upper surface 124.

The top plate 15 is fixed so as to span between a pair of the first flange portion 11 and the second flange portion 12. The top plate 15 has a bottom surface 151 facing toward the core 10, and a top surface 152 facing toward an opposite side to the bottom surface 151. The top plate 15 is disposed such that the top surface 152 is parallel to a WL-plane. Although the shape of the top plate 15 when viewed in the T direction is not limited, the shape of the top plate 15 is a rectangular shape having long sides parallel to the L direction and short sides parallel to the W direction in the embodiment. The top surface 152 corresponds to "the top surface on an opposite side to a second facing surface" described in the appended claims. The bottom surface 151 corresponds to "a bottom surface on an opposite side to the top surface and including the second facing surface" described in the appended claims.

The top plate 15 is attached to the upper surface 114 of the first flange portion 11 and the upper surface 124 of the second flange portion 12 by an adhesive 51. The adhesive 51 is preferably a thermosetting epoxy resin. The adhesive 51 is preferably added with an inorganic filler, such as silica filler, in order to improve thermal shock resistance. Examples of a method of applying the adhesive 51 include the following methods. When the adhesive 51 is applied to only the core 10, a method of dipping the upper surface 114 of the first flange portion 11 and the upper surface 124 of the second flange portion 12 with the adhesive 51 may be used. When the adhesive 51 is applied to only the top plate 15, a method of applying the adhesive 51 to the top plate 15 with a dispenser or a method of printing the adhesive 51 on the top plate 15 with a printer may be used. The adhesive 51 preferably contains magnetic particles. Thus, coil characteristics are improved as compared to when the adhesive 51 does not contain magnetic particles.

The material of the top plate 15 is, for example, the same as that of the core 10. Since the core 10 and the top plate 15 both are magnetic substances, the core 10 and the top plate 15 make up a closed magnetic circuit, with the result that the efficiency of acquiring an inductance value improves. Therefore, magnetic efficiency increases, with the result that a desired inductance value is obtained with a small number of wires.

The bottom surface 151 of the top plate 15 preferably has a cutout (resin clearance) at least in one of both end parts in the W direction. Thus, when the core 10 and the top plate 15 are bonded to each other with the adhesive 51, the adhesive 51 can be guided to the cutout **15*n* and stored in the cutout 15*n*. Therefore, even when the amount of adhesive 51 is excessive, it is possible to reduce squeeze-out of adhesive 51 to outside the coil component 1. In the embodiment, the cutout 15*n* is provided over all around the bottom surface 151 of the top plate 15. In other words, the cutout 15*n* is provided all over a ridge portion between the bottom surface 151 and side surfaces of the top plate 15. Alternatively, the cutout 15*n* may be provided at part of the outer periphery of the bottom surface 151 of the top plate 15 or does not need to be provided in the top plate 15**.

The shape of the first flange portion 11 is not limited except the shape of the upper surface 114. In the embodiment, the first flange portion 11 has two foot portions on the lower surface 113 side. A first terminal electrode 31 is provided at one of the foot portions, and a second terminal electrode 32 is provided at the other one of the foot portions. Similarly, the shape of the second flange portion 12 is not limited except the shape of the upper surface 124. In the embodiment, the second flange portion 12 has two foot portions on the lower surface 123 side. A third terminal electrode 33 is provided at one of the foot portions, on the same side of the foot portion provided with the first terminal electrode 31. A fourth terminal electrode 34 is provided at the other one of the foot portions, on the same side of the foot portion provided with the second terminal electrode 32. As shown in FIG. 1, the lower surface 113 and the lower surface 123 each represent a portion including bottom surface parts of the foot portions through side surface parts of a crotch portion between the foot portions to a bottom surface part of the crotch portion.

Although an electrically conductive material of the first to fourth terminal electrodes 31 to 34 is not limited, a good conductor metal, such as Ag and Cu, is preferably contained. As a method of forming the first to fourth terminal electrodes 31 to 34, for example, a base electrode is formed by applying Ag paste containing Ag, Si, and a resin onto the lower surface 113 of the first flange portion 11 and the lower surface 123 of the second flange portion 12 with a dip method and firing the Ag paste. After that, a thin film of Cu/Ni/Sn or the like is formed by plating. The first to fourth terminal electrodes 31 to 34 may be formed by sticking a metal sheet with an adhesive to the lower surface 113 and the outer end surface 112 of the first flange portion 11 and the lower surface 123 and the outer end surface 122 of the second flange portion 12.

The first wire 21 and the second wire 22 each are preferably electrically insulating coating conductors that a conductor made of a good conductor metal, such as copper, silver, and gold, is covered with a coating made of a resin, such as polyurethane and polyamide-imide. The wire diameter of each of the first wire 21 and the second wire 22 is preferably greater than or equal to 20 μm and less than or equal to 50 μm (i.e., from 20 μm to 50 μm). One end of the first wire 21 is electrically connected to the first terminal electrode 31, and the other end of the first wire 21 is electrically connected to the third terminal electrode 33. One end of the second wire 22 is electrically connected to the second terminal electrode 32, and the other end of the second wire 22 is electrically connected to the fourth terminal electrode 34. The first wire 21 and the second wire 22 are connected to the first to fourth terminal electrodes 31 to 34 by, for example, thermocompression bonding, brazing, welding, or the like.

The first wire 21 and the second wire 22 are wound around the core portion 13 in the same direction. Thus, in the coil component 1, when signals in opposite phase, such as a differential signal, are respectively input to the first wire 21 and the second wire 22, magnetic fluxes respectively generated by the first wire 21 and the second wire 22 cancel out each other. Also, the function of the coil component 1 as an inductor weakens to pass the signals. On the other hand, when signals in phase, such as an extraneous noise, are respectively input to the first wire 21 and the second wire 22, magnetic fluxes respectively generated by the first wire 21 and the second wire 22 reinforce each other. With the result that, the function of the coil component 1 as an inductor strengthens to block passage of the noises. Therefore, the coil component 1 functions as a common mode choke coil that attenuates a common mode signal, such as an extraneous noise, while decreasing a passage loss of a differential mode signal, such as a differential signal.

When the coil component 1 is mounted on a mounting substrate, the lower surface 113 of the first flange portion 11 and the lower surface 123 of the second flange portion 12 face the mounting substrate. At this time, the axis AX direction of the core portion 13 is parallel to a major surface of the mounting substrate. In other words, the coil component 1 is of a horizontally winding type in which the winding axis of the first wire 21 and the winding axis of the second wire 22 are parallel to the mounting substrate.

Figure 2:
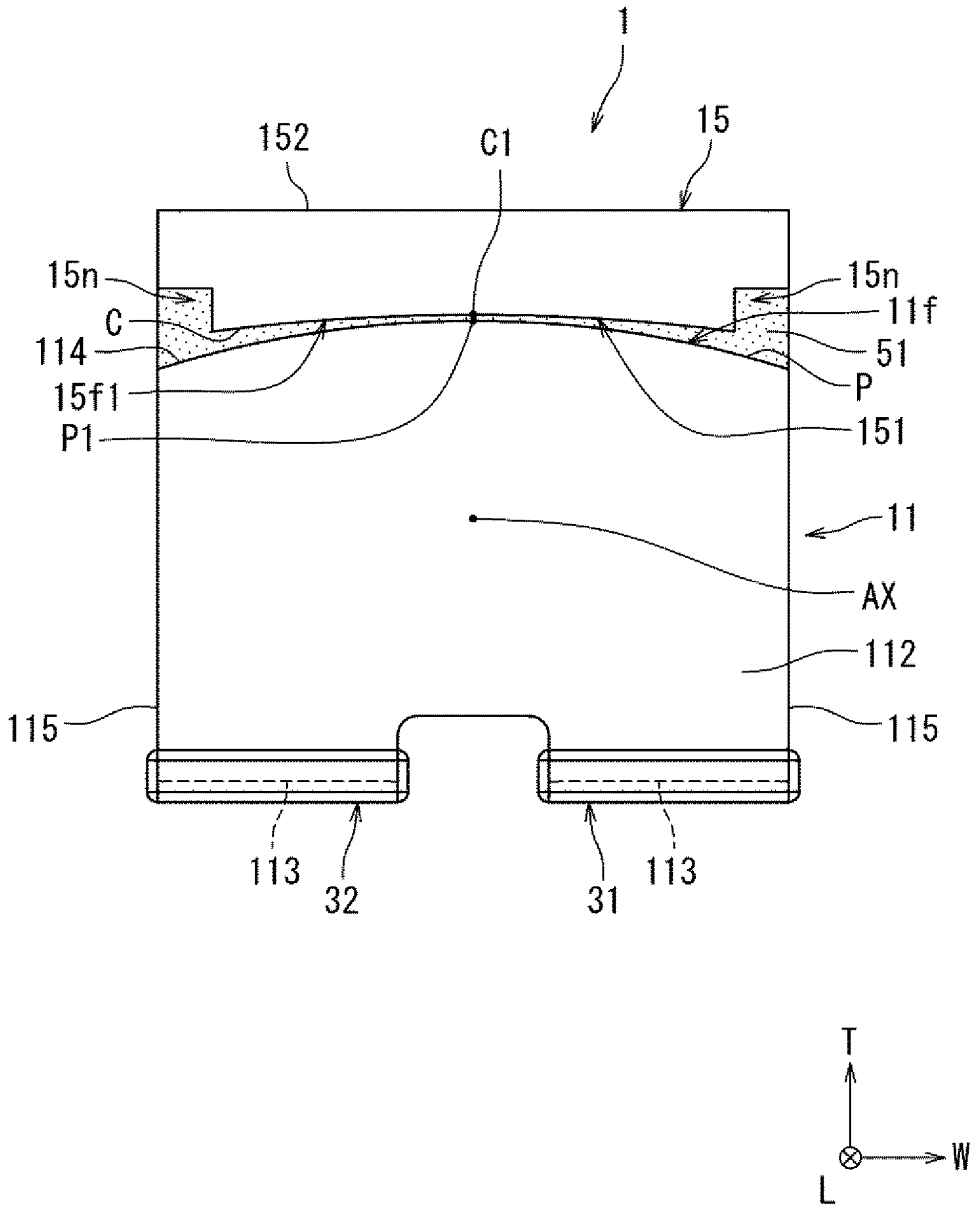
FIG. 2 is a view of the coil component when viewed in an L direction.
Figure 3:
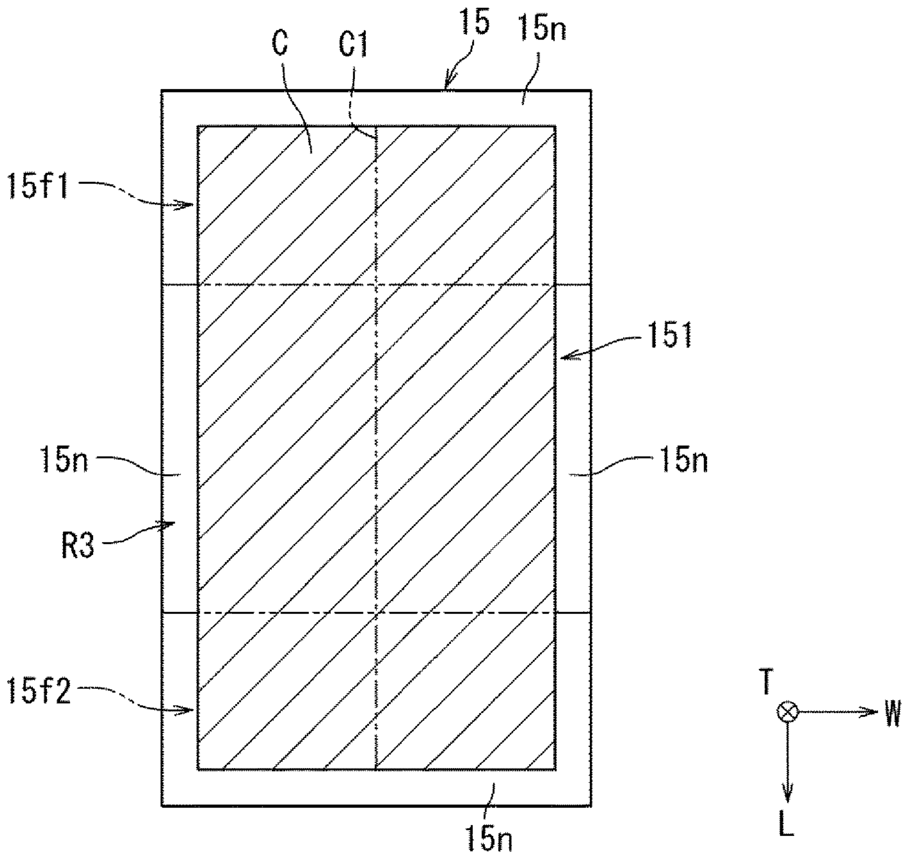
FIG. 3 is a view of a top plate when viewed from a bottom surface side.
Figure 4:
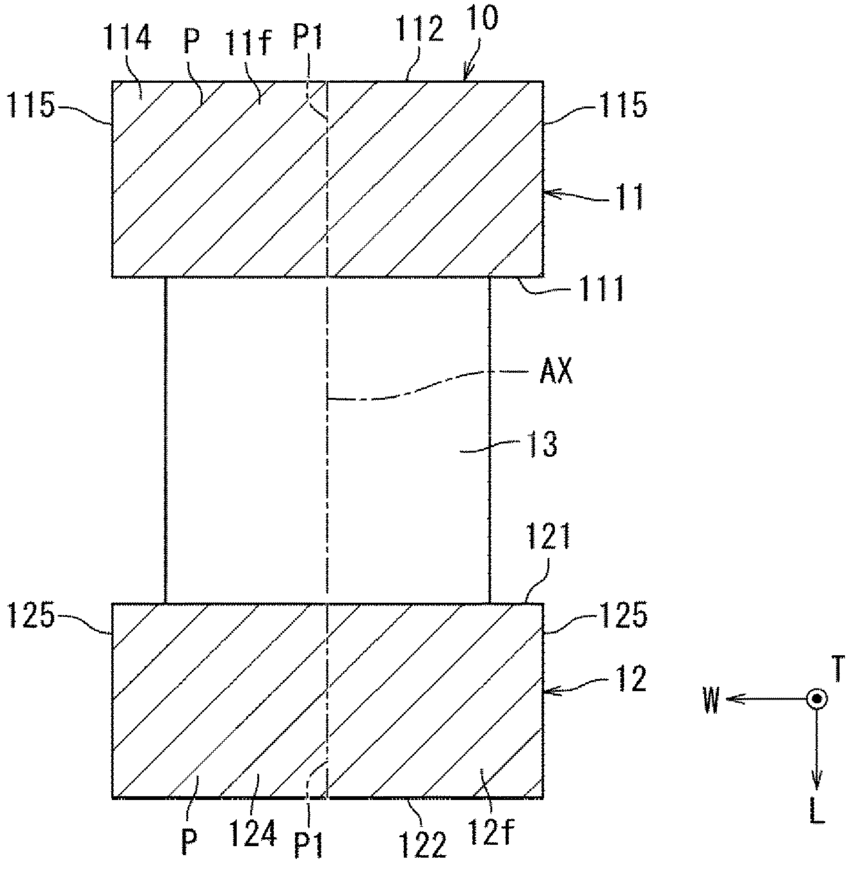
FIG. 4 is a view of a core when viewed from an upper surface side of a first flange portion and a second flange portion.

Detailed Configuration of Bottom Surface of Top Plate and Upper Surfaces of First and Second Flange Portions Next, the detailed configuration of the bottom surface 151 of the top plate 15 and the upper surfaces 114, 124 of the first and second flange portions 11, 12 will be described. FIG. 2 is a view of the coil component 1 when viewed in the L direction. FIG. 3 is a view of the top plate 15 when viewed from the bottom surface 151 side. FIG. 4 is a view of the core 10 when viewed from the upper surface 114 side of the first flange portion 11 and the upper surface 124 side of the second flange portion 12.

As shown in FIGS. 2, 3, and 4, the first flange portion 11 and the top plate 15, respectively, have facing surfaces facing each other. More specifically, the upper surface 114 of the first flange portion 11 has a first facing surface **11*f* facing the top plate 15. The first facing surface 11*f* is a part, overlapping the top plate 15, of the upper surface 114 of the first flange portion 11 when viewed in the T direction. In the embodiment, the first facing surface 11*f* is the entire upper surface 114 of the first flange portion 11**.

The bottom surface 151 of the top plate 15 has a second facing surface **15*f*1 facing the first flange portion 11. The second facing surface 15*f*1 is a part, overlapping the first flange portion 11, of the bottom surface 151 of the top plate 15 when viewed in the T direction. In the embodiment, the second facing surface 15*f*1 is a first flange portion 11-side end part of the bottom surface 151 of the top plate 15**.

A protruding portion P having a convex shape and convex toward the top plate 15 in a cross section that is orthogonal to the axis AX direction and that intersects with the first flange portion 11 is provided on a first flange portion 11-side first facing surface **11*f*. The convex shape of the protruding portion P is a convex curved surface convex toward the top plate 15 when viewed in the axis AX direction. In the embodiment, the protruding portion P is provided on the entire upper surface 114 of the first flange portion 11. In other words, the entire upper surface 114 of the first flange portion 11 is provided as a convex curved surface convex toward the top plate 15 when viewed in the axis AX direction. However, the configuration is not limited thereto. The protruding portion P may be provided at part of the upper surface 114 of the first flange portion 11. For example, of the upper surface 114 of the first flange portion 11**, both end parts in the W direction may be flat surfaces, and a part other than both end parts may be a convex curved surface.

The protruding portion P has a topmost part P1 when viewed in the axis AX direction. The topmost part P1 is a part located on the uppermost side in the protruding portion P. In the embodiment, the topmost part P1 extends in the L direction when viewed in the T direction. In other words, the protruding portion P has the same shape in any cross section orthogonal to the axis AX direction. However, the configuration is not limited thereto. The protruding portion P may have a different shape depending on a cross section orthogonal to the axis AX direction. In FIG. 4, for the sake of convenience, locations where the protruding portions P are present are diagonally shaded.

A recessed portion C having a concave shape and complementing the convex shape of the protruding portion P of the first flange portion 11 is provided on a top plate 15-side second facing surface **15*f*1**. The concave shape complementing the convex shape of the protruding portion P is a concave shape such that the entire inner surface of the recessed portion C contacts with the surface of the protruding portion P when the recessed portion C and the protruding portion P are brought close to each other in the T direction or a shape such that the inner surface shape of the recessed portion C is formed along the surface shape of the protruding portion P. The concave shape means a concave shape such that, when the recessed portion C and the protruding portion P are brought close to each other in the T direction, part of the inner surface of the recessed portion C contacts with part of the surface of the protruding portion P and the other part of the inner surface of the recessed portion C is spaced apart from the surface of the protruding portion P with a slight distance. The slight distance is, for example, greater than 0 μm and less than or equal to 10 μm (i.e., from greater 0 μm to 10 μm) and, more specifically, greater than or equal to 1 μm and less than or equal to 5 μm (i.e., from 1 μm to 5 μm).

In the embodiment, the concave shape of the recessed portion C is a concave curved shape concave toward the inside of the top plate 15 when viewed in the axis AX direction. On the second facing surface **15*f*1, the cutout 15*n* is provided at both end parts in the W direction and the first flange portion 11-side end part in the L direction, and the recessed portion C is provided on the entire part other than the cutout 15*n*. In other words, on the second facing surface 15*f*1, the entire part other than the cutout 15*n* is a concave curved surface concave toward the inner side of the top plate 15 when viewed in the axis AX direction. However, the configuration is not limited thereto. The recessed portion C may be provided at part of the portion other than the cutout 15*n* on the second facing surface 15*f*1. When the cutout 15*n* is not provided in the top plate 15, the recessed portion C may be provided on the entire second facing surface 15*f*1**.

The inner surface of the recessed portion C has a topmost part C1 when viewed in the axis AX direction. The topmost part C1 is a part located on the uppermost side in the inner surface of the recessed portion C. In the embodiment, the topmost part C1 extends in the L direction when viewed in the T direction. In other words, the recessed portion C has the same shape in any cross section orthogonal to the axis AX direction. However, the configuration is not limited thereto. The recessed portion C may have a different shape depending on a cross section orthogonal to the axis AX direction. In FIG. 3, for the sake of convenience, a location where the recessed portion C is present is diagonally shaded.

The convex shape of the protruding portion P and the concave shape of the recessed portion C can be checked through noncontact optical measurement with, for example, a hybrid laser microscope (OPTELICS HYBRID+) produced by Lasertec Corporation. In optical measurement, for example, phase-shifting interferometry measurement may be performed.

In the embodiment, the top surface 152 of the top plate 15 is a flat surface; however, the top surface 152 of the top plate 15 does not need to be a flat surface. For example, the top surface 152 may be a concave curved surface concave toward the inner side of the top plate 15. In this case, "a top surface" in "a direction parallel to the top surface of a top plate" and in "a direction orthogonal to the top surface of the top plate" described in the appended claims may be an imaginary plane connecting a periphery of the top surface 152 of the top plate 15. In addition, for example, when a cutout is provided at the periphery of the top surface 152 of the top plate 15 or the periphery of the top surface 152 of the top plate 15 is rounded, "the top surface" in "the direction parallel to the top surface of the top plate" and in "the direction orthogonal to the top surface of the top plate" described in the appended claims may be a part excluding a part provided with a cutout or a rounded part from the top surface 152.

The above-described configuration is also similar to that of the second flange portion 12. In other words, the second flange portion 12 and the top plate 15, respectively, have facing surfaces facing each other. A protruding portion P having a convex shape and convex toward the top plate 15 when viewed in the axis AX direction is provided on a second flange portion 12-side first facing surface **12*f*. A recessed portion C having a concave shape and complementing the convex shape of the protruding portion P of the second flange portion 12 is provided on a top plate 15-side second facing surface 15*f*2**.

With the coil component 1, since the convex shape of the protruding portion P provided on the first flange portion 11 or the second flange portion 12 complements the concave shape of the recessed portion C provided on the top plate 15, a distance between the top plate 15-side second facing surface **15*f*1 and the first flange portion 11-side first facing surface 11*f* and a distance between the top plate 15-side second facing surface 15*f*2 and the second flange portion 12-side first facing surface 12*f* are reduced as compared to when a core having a protruding portion on the upper surface of the first flange portion and a protruding portion on the upper surface of the second flange portion is combined with a top plate having a flat bottom surface. As a result, magnetic reluctance that is generated by a space between the top plate 15-side second facing surface 15*f*1 and the first flange portion 11-side first facing surface 11*f* and a space between the top plate 15-side second facing surface 15*f*2 and the second flange portion 12-side first facing surface 12*f* is reduced to increase effective magnetic permeability, with the result that coil characteristics are improved. The coil characteristics are, for example, an inductance and common mode noise attenuation characteristics Scc21**.

Other Preferred Configurations

Figure 5:
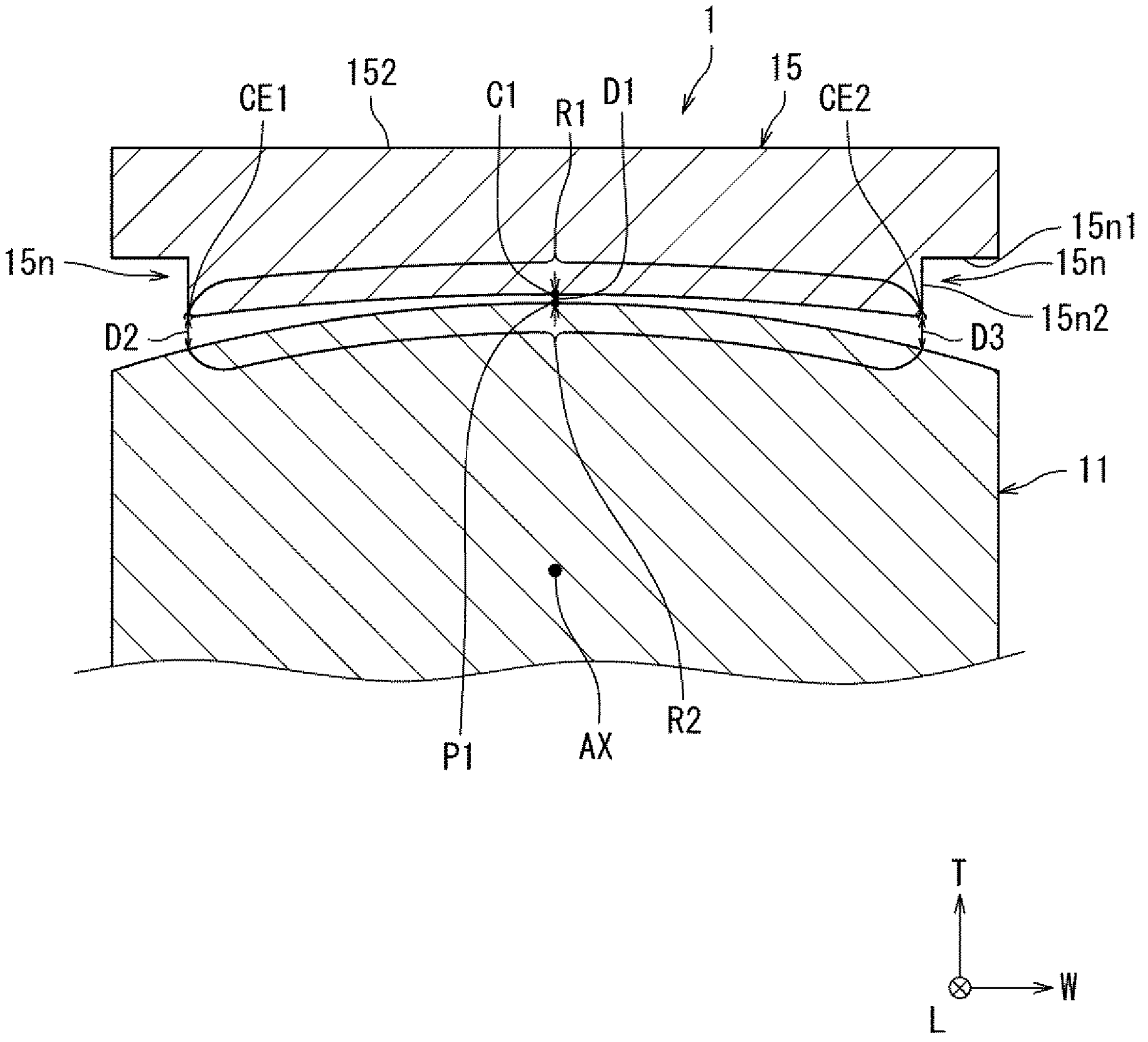
FIG. 5 is a cross-sectional view taken along the line V-V in FIG. 1.

FIG. 5 is a cross-sectional view taken along the line V-V in FIG. 1. FIG. 5 is a cross-sectional view of the coil component 1, taken along a WT-plane. The cross section of FIG. 5 corresponds to "a cross section orthogonal to the axial direction and intersecting with a first flange portion" described in the appended claims. In FIG. 5, for the sake of convenience, the adhesive 51 is not shown.

As shown in FIG. 5, preferably, the topmost part P1 of the protruding portion P of the first flange portion 11 is disposed at the center of the first flange portion 11 in the W direction. With this configuration, even when the first flange portion 11 is disposed so as to be shifted with respect to the top plate 15 in the W direction, a distance between the top plate 15-side second facing surface **15*f*1 and the first flange portion 11-side first facing surface 11*f* is further reliably reduced at the topmost part P1 of the protruding portion P. Similarly, when viewed in the axis AX direction, the topmost part P1 of the protruding portion P of the second flange portion 12 may be disposed at the center of the second flange portion 12** in the W direction.

Preferably, (i) the topmost part C1 of the inner surface of the recessed portion C, (ii) the topmost part P1 of the protruding portion P, and (iii) at least one of both end parts of the recessed portion C in the W direction are arranged in this order from the top plate 15 side. More specifically, in the T direction, the topmost part C1 of the inner surface of the recessed portion C, the topmost part P1 of the protruding portion P, and a first end part CE1 of the recessed portion C in the W direction are arranged in this order from the top plate 15 side. In the T direction, the topmost part C1 of the inner surface of the recessed portion C, the topmost part P1 of the protruding portion P, and a second end part CE2 of the recessed portion C in the W direction are arranged in this order from the top plate 15 side. With this configuration, a distance between the top plate 15-side second facing surface **15*f*1 and the first flange portion 11-side first facing surface 11*f*** is further reliably reduced in the W direction.

Preferably, when viewed in the T direction, the protruding portion P and the recessed portion C, respectively, have regions that are parts overlapping each other, and a distance between the protruding portion P and the recessed portion C at each of both end parts of each of the regions that are the overlapping parts in the W direction is greater than a distance between the protruding portion P and the recessed portion C at the center of each of the regions that are the overlapping parts in the W direction.

More specifically, the recessed portion C has a region R1 that is a part overlapping the protruding portion P when viewed in the T direction. The protruding portion P has a region R2 that is a part overlapping the recessed portion C when viewed in the T direction. A distance D2 between the protruding portion P and the recessed portion C at the end part on one side of each of the regions R1, R2 in the W direction is greater than a distance D1 between the protruding portion P and the recessed portion C at the center of each of the regions R1, R2 in the W direction. A distance D3 between the protruding portion P and the recessed portion C at the end part on the other side of each of the regions R1, R2 in the W direction is greater than the distance D1 between the protruding portion P and the recessed portion C at the center of each of the regions R1, R2 in the W direction. The distance D1 is, for example, greater than or equal to 0 μm and less than or equal to 2 μm (i.e., from greater than 0 μm to 2 μm). The state where the distance D1 is 0 μm means that the top plate 15 and the first flange portion 11 are in contact with each other at the center of each of the regions R1, R2 in the W direction. The distance D2 and the distance D3 each are, for example, greater than 0 μm and less than or equal to 10 μm (i.e., from greater than 0 μm to 10 μm) and, more specifically, greater than or equal to 1 μm and less than or equal to 5 μm (i.e., from 1 μm to 5 μm). With this configuration, a distance between the top plate 15-side second facing surface **15*f*1 and the first flange portion 11-side first facing surface 11*f* is further reliably reduced at the center of each of the regions R1, R2 in the W direction. Particularly, when the distance D2 and the distance D3 are less than or equal to 10 μm, the coil characteristics of the coil component 1** are further improved.

Preferably, the topmost part of the inner surface of the cutout **15*n*, the topmost part C1 of the inner surface of the recessed portion C, the topmost part P1 of the protruding portion P, and the end part CE1 and/or the end part CE2, provided with the cutout 15*n*, of both end parts of the recessed portion C in the W direction are arranged in this order from the top plate 15 side. The topmost part of the inner surface of the cutout 15*n* is a part located at the uppermost side in the inner surface of the cutout 15*n***.

More specifically, the inner surface of the cutout 15*n* has an inner top surface 15*n*1 spreading along the WL-plane and an inner side surface 15*n*2 spreading along an LT-plane. In the embodiment, the inner top surface 15*n*1 is the topmost part of the inner surface of the cutout 15*n*. In the T direction, the inner top surface 15*n*1, the topmost part C1 of the inner surface of the recessed portion C, the topmost part P1 of the protruding portion P, and the end part CE1 and/or the end part CE2, provided with the cutout 15*n*, of both end parts of the recessed portion C in the W direction are arranged in this order from the top plate 15 side. The shape of the inner surface of the cutout 15*n* is not limited. With this configuration, since the size of the cutout 15*n* is increased, it is possible to guide and store a larger amount of adhesive into the cutout 15*n*, so squeeze-out of adhesive to outside the coil component 1 is further reliably reduced.

Preferably, when viewed in the T direction, the cutout 15*n* overlaps the protruding portion P of the first flange portion 11. With this configuration, in comparison with the case where the cutout 15*n* does not overlap the protruding portion P of the first flange portion 11, leakage of the adhesive 51 from the end part CE1 or end part CE2 of the recessed portion C in the W direction to outside the coil component 1 is reduced, so the adhesive 51 is further reliably guided to the cutout 15*n*.

Preferably, as shown in FIG. 3, the recessed portion C of the top plate 15 extends to a region R3 overlapping the core portion 13 in the bottom surface 151 of the top plate 15 when viewed in the T direction. More specifically, the recessed portion C of the top plate 15 extends in the L direction from a part of the recessed portion C provided on the second facing surface 15*f*1 when viewed in the T direction and connects with a part of the recessed portion C provided on the second facing surface 15*f*2.

According to the above configuration, even when the first flange portion 11 is disposed so as to be shifted with respect to the top plate 15 toward the region R3 overlapping the core portion 13, a distance between the top plate 15-side second facing surface 15*f*1 and the first flange portion 11-side first facing surface 11*f* is reduced, so coil characteristics are improved. Similarly, even when the second flange portion 12 is disposed so as to be shifted with respect to the top plate 15 toward the region R3 overlapping the core portion 13, a distance between the top plate 15-side second facing surface 15*f*2 and the second flange portion 12-side first facing surface 12*f* is reduced, so coil characteristics are improved.

Figure 6:
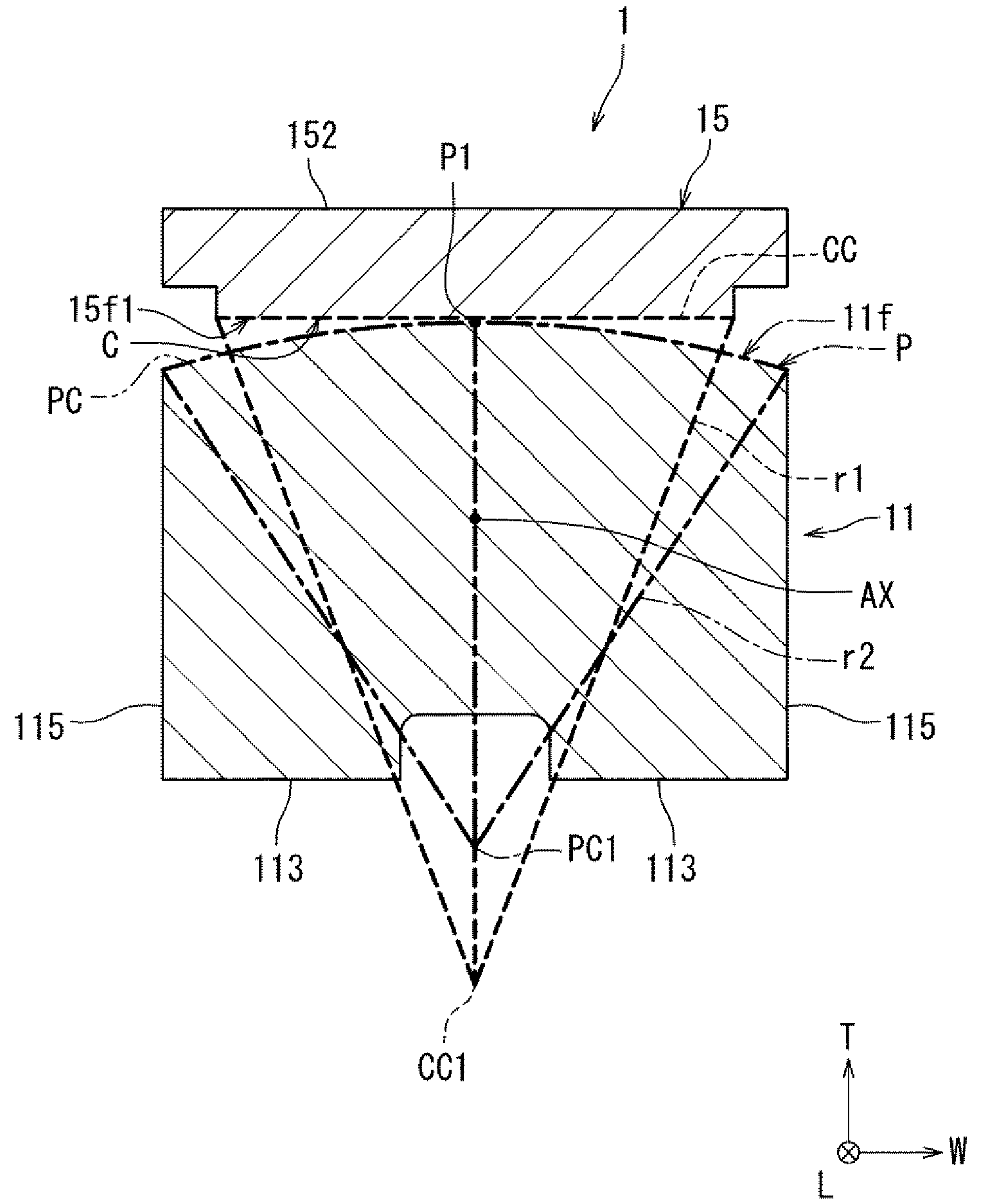
FIG. 6 is a cross-sectional view for illustrating a circle of curvature of a recessed portion of the top plate and a circle of curvature of a protruding portion of the first flange portion.

FIG. 6 is a cross-sectional view for illustrating the circle of curvature of the recessed portion C of the top plate 15 and the circle of curvature of the protruding portion P of the first flange portion 11. FIG. 6 is the same cross section as FIG. 5. In FIG. 6, for the sake of convenience, the adhesive 51 and the terminal electrodes 31, 32 are not shown. As shown in FIG. 6, preferably, a radius of curvature r1 of the recessed portion C of the top plate 15 is greater than a radius of curvature r2 of the protruding portion P of the first flange portion 11. The radius of curvature r1 is, for example, 70 mm. The radius of curvature r2 is, for example, 60 mm.

With the above configuration, in comparison with a case where the radius of curvature r1 of the recessed portion C of the top plate 15 is less than the radius of curvature r2 of the protruding portion P of the first flange portion 11, a distance between the top plate 15-side second facing surface 15*f*1 and the first flange portion 11-side first facing surface 11*f* is further reliably reduced at the topmost part P1 of the protruding portion P in the T direction. Similarly, at the second flange portion 12 side, when viewed in the axis AX direction, the radius of curvature of the recessed portion C of the top plate 15 may be greater than the radius of curvature of the protruding portion P of the second flange portion 12.

Preferably, a center CC1 of the circle of curvature CC of the recessed portion C of the top plate 15 is located outside the first flange portion 11. With this configuration, in comparison with a case where the center CC1 of the circle of curvature CC of the recessed portion C of the top plate 15 is located inside the first flange portion 11, the radius of curvature r1 of the recessed portion C of the top plate 15 is increased. Thus, it is easy to control the depth of the recessed portion C at the time of molding the top plate 15, so variations in the depth of the recessed portion C are reduced. As a result, variations in coil characteristics are also reduced. Similarly, at the second flange portion 12 side, when viewed in the axis AX direction, the center of the circle of curvature of the recessed portion C of the top plate 15 may be located outside the second flange portion 12.

Preferably, a center PC1 of a circle of curvature PC of the protruding portion P of the first flange portion 11 is located outside the first flange portion 11. With this configuration, in comparison with a case where the center PC1 of the circle of curvature PC of the protruding portion P of the first flange portion 11 is located inside the first flange portion 11, the radius of curvature r2 of the protruding portion P of the first flange portion 11 is increased. Thus, it is easy to control the height of the protruding portion P at the time of molding the core 10, so variations in the height of the protruding portion P are reduced. As a result, variations in coil characteristics are also reduced. Similarly, at the second flange portion 12 side, when viewed in the axis AX direction, the center of the circle of curvature of the protruding portion P of the second flange portion 12 may be located outside the second flange portion 12.

Manufacturing Method

Next, a manufacturing method for the coil component 1 will be described. The manufacturing method for the coil component 1 includes forming a core 10 having a protruding portion P in a first flange portion 11 by forming a core molded body through first press molding of a core material and then firing the core molded body, forming a top plate 15 having a recessed portion C by forming a top plate molded body through second press molding of a top plate material and then firing the top plate molded body, winding a first wire 21 and a second wire 22 around a core portion 13 of the core 10, and combining the top plate 15 with the core 10 in which the first wire 21 and the second wire 22 are wound. Preferably, the first press molding is to compress the core molded body with an upper punch and a lower punch. With this configuration, the protruding portion is easily formed in the first flange portion 11 of the core 10. In addition, manufacturing cost is reduced as compared to when the core molded body is compressed with a plurality of upper punches and a plurality of lower punches.

Preferably, the second press molding is to compress the top plate molded body with an upper punch and a lower punch. With this configuration, the top plate molded body is easily manufactured. In addition, manufacturing cost is reduced as compared to when the top plate molded body is compressed with a plurality of upper punches and a plurality of lower punches.

An example of the manufacturing method for the coil component 1 will be specifically described with reference to FIGS. 7A to 7F, and 8A to 8C. FIGS. 7A to 7F are views for illustrating a method of forming a core molded body. FIGS. 8A to 8C are views for illustrating a method of forming a top plate molded body. FIGS. 7A to 7F correspond to "first press molding" described in the appended claims. FIGS. 8A to 8C correspond to "second press molding" described in the appended claims. The method described below is an example, and the manufacturing method for the coil component 1 is not limited to the method described below.

Formation of Core

Figure 7A:
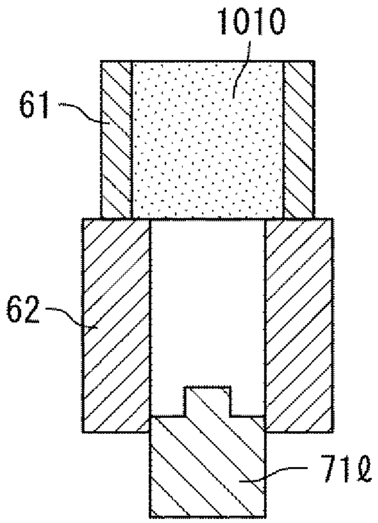
FIG. 7A is a view for illustrating a method of forming a core molded body.
Figure 8A:
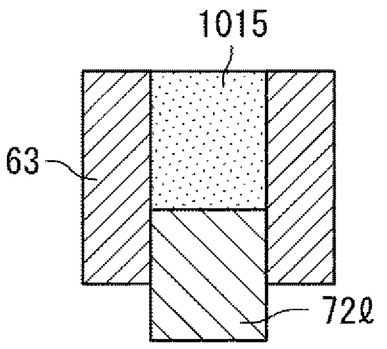
FIG. 8A is a view for illustrating a method of forming a top plate molded body.
Figure 8B:
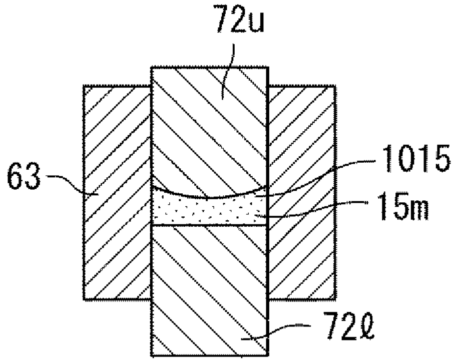
FIG. 8B is a view for illustrating the method of forming the top plate molded body.
Figure 8C:
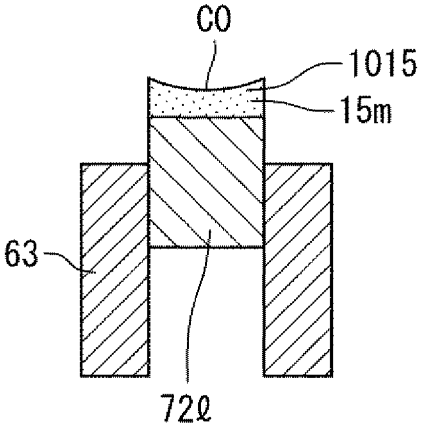
FIG. 8C is a view for illustrating the method of forming the top plate molded body.

As shown in FIG. 7A, a feeder (raw material supply unit) 61 filled with a core material 1010 is moved onto a die 62. A lower punch 711 is placed at an opening portion at the lower side of the die 62. The upper surface of the lower punch 711 is formed into a shape corresponding to the shape of the core 10 to be formed. The core material 1010 is, for example, ferrite particles.

Figure 7B:
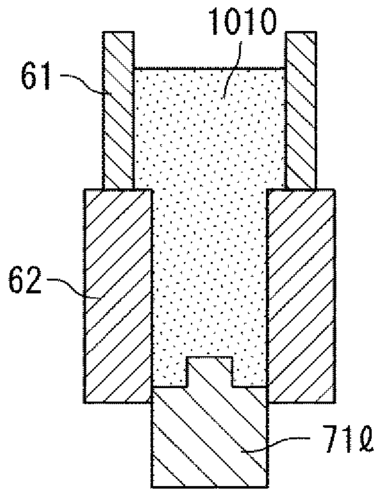
FIG. 7B is a view for illustrating the method of forming the core molded body.
Figure 7C:
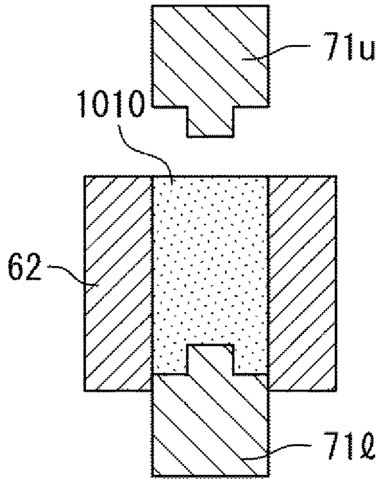
FIG. 7C is a view for illustrating the method of forming the core molded body.

As shown in FIG. 7B, the core material 1010 is filled into the die 62. As shown in FIG. 7C, after the feeder 61 that has completed filling the core material 1010 is removed, an upper punch 71*u* is placed above the die 62. The lower surface of the upper punch 71*u* is formed in a shape corresponding to the shape of the core 10 to be formed. The lower surface of the upper punch 71*u* has a concave shape for forming the convex shape of the protruding portion P of each of the first flange portion 11 and the second flange portion 12.

Figure 7D:
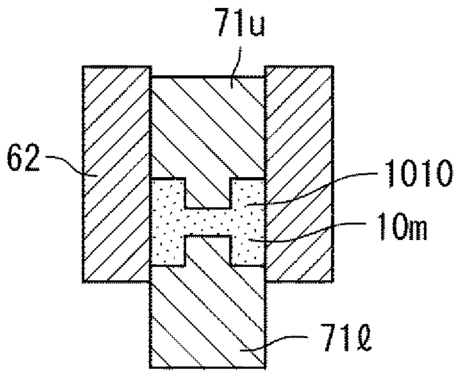
FIG. 7D is a view for illustrating the method of forming the core molded body.

As shown in FIG. 7D, the upper punch 71*u* is inserted into the die 62 to compress the core material 1010. Thus, a core molded body 10*m* that will be the core 10 is formed. In this way, the core molded body 10*m* is compressed with the single upper punch 71*u* and the single lower punch 711. In other words, a part that will be the core portion 13 and a part that will be the first flange portion 11, and a part that will be the second flange portion 12 are formed with the single upper punch 71*u* and the single lower punch 711 at the same time. However, the configuration is not limited thereto. The core molded body 10*m* may be compressed with a plurality of upper punches. More specifically, a part that will be the core portion 13 may be formed by using a first upper punch, and a part that will be the first flange portion 11 and a part that will be the second flange portion 12 may be formed by using a second upper punch different from the first upper punch.

Figure 7E:
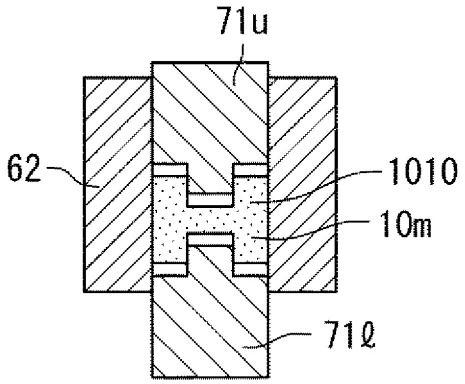
FIG. 7E is a view for illustrating the method of forming the core molded body.
Figure 7F:
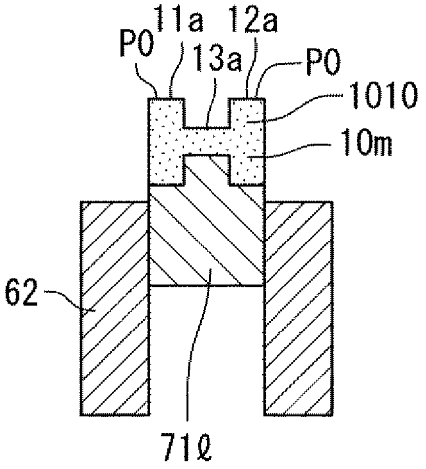
FIG. 7F is a view for illustrating the method of forming the core molded body.

As shown in FIG. 7E, the upper punch 71*u* is moved upward. As shown in FIG. 7F, after the upper punch 71*u* is removed, the lower punch 711 is moved upward to take out the core molded body 10*m*. The core molded body 10*m* has a first part 11*a* that will be the first flange portion 11, a second part 12*a* that will be the second flange portion 12, and a third part 13*a* that will be the core portion 13. A protruding portion P0 that will be the protruding portion P is formed on each of the upper surface of the first part 11*a* and the upper surface of the second part 12*a*. After that, the core 10 having the protruding portion P at each of the first flange portion 11 and the second flange portion 12 is formed by firing the core molded body 10*m*. After that, the core 10 is subjected to barrel polishing for deburring. After that, the bottom surface side of the core 10 is dipped into Ag paste and fired, and then a Cu/Ni/Sn thin film is plated to form the first to fourth terminal electrodes 31 to 34.

A method of forming the protruding portion P is not limited to the above method. For example, in the core molded body 10*m*, the density of powder may be nonuniform, the core molded body 10*m* may be fired, and then the protruding portion P may be formed. Specifically, for example, in the core molded body 10*m*, the density of the powder of the first part 11*a* that will be the first flange portion 11 and the density of the powder of the second part 12*a* that will be the second flange portion 12 are reduced as compared to the density of the powder of the third part 13*a* that will be the core portion 13. A part where the density of powder is small increases in the degree of shrinkage after firing as compared to a part where the density of the powder is large. For this reason, the degree of shrinkage after firing is high in the first part 11*a* and the second part 12*a*, and the protruding portion P is formed at each of the first flange portion 11 and the second flange portion 12.

Formation of Top Plate

As shown in FIG. 8A, a top plate material 1015 is filled into a die 63. A lower punch 721 is placed at an opening portion at the lower side of the die 63. The upper surface of the lower punch 721 is formed in a shape corresponding to the shape of the top plate 15 to be formed. The top plate material 1015 is, for example, ferrite particles.

As shown in FIG. 8B, an upper punch 72*u* is inserted into the die 63 to compress the top plate material 1015. Thus, a top plate molded body 15*m* that will be the top plate 15 is formed. In this way, the top plate molded body 15*m* is compressed with the single upper punch 72*u* and the single lower punch 721. The lower surface of the upper punch 72*u* is formed in a shape corresponding to the shape of the top plate 15 to be formed. The lower surface of the upper punch 72*u* has a convex shape for forming the concave shape of the recessed portion C of the top plate 15.

As shown in FIG. 8C, after the upper punch 72*u* is removed, the lower punch 721 is moved upward to take out the top plate molded body 15*m*. A recessed portion C0 that will be the recessed portion C of the top plate 15 is formed on the upper surface of the top plate molded body 15*m*. After that, the top plate 15 having the recessed portion C is formed by firing the top plate molded body 15*m*.

Winding of Coil and Assembling of Coil Component

After that, a first wire 21 and a second wire 22 are wound around the core portion 13 of the core 10 with a nozzle. After that, the first wire 21 and the second wire 22 are pressure-bonded to the first to fourth terminal electrodes 31 to 34 with a heater tip. After that, the top plate 15 is assembled to the core 10 by using an adhesive 51 to manufacture the coil component 1.

Second Embodiment

Figure 9:
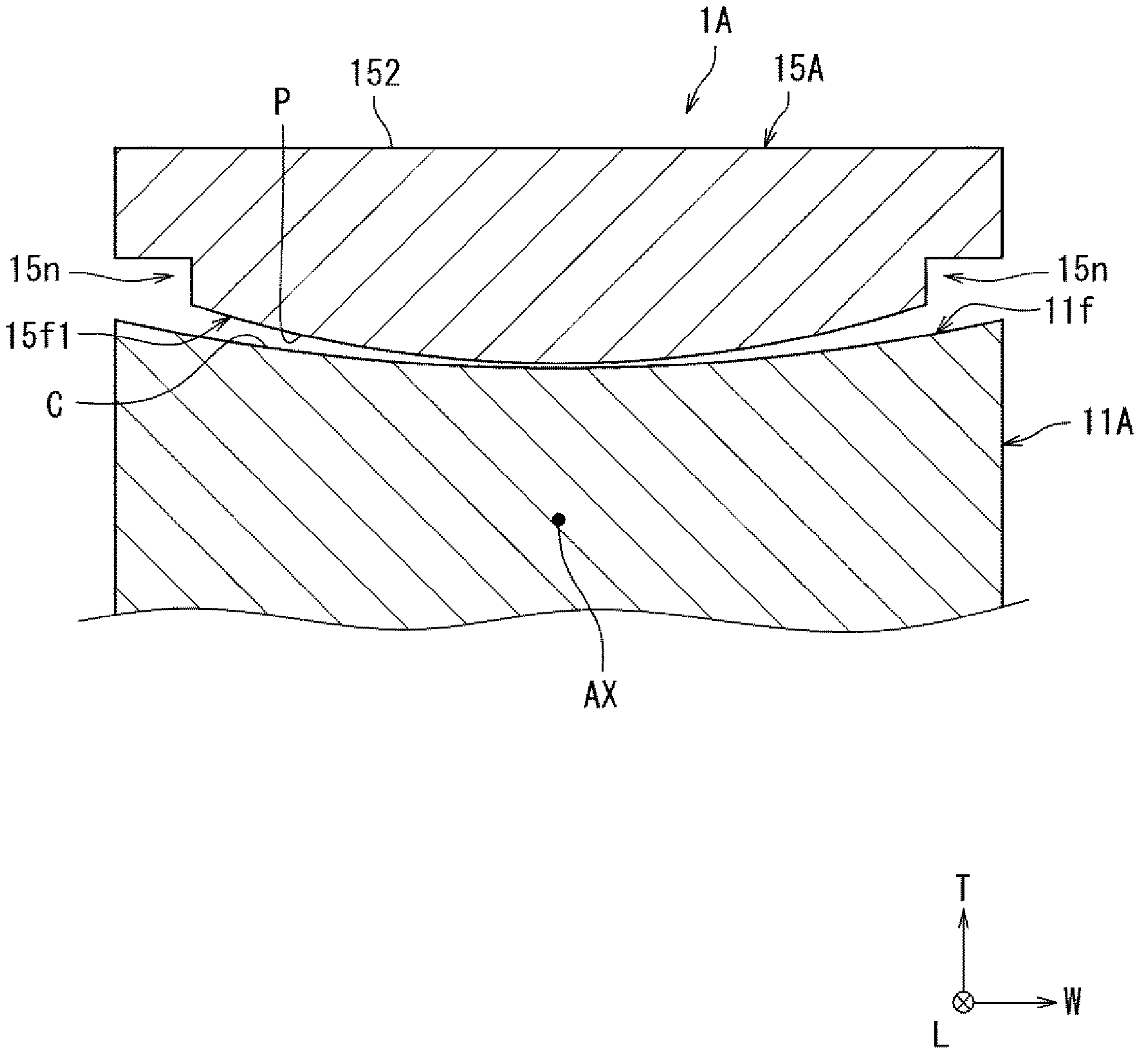
FIG. 9 is a cross-sectional view of a second embodiment of a coil component.

FIG. 9 is a cross-sectional view of a second embodiment of a coil component. FIG. 9 corresponds to FIG. 5 of the first embodiment. The second embodiment differs from the first embodiment in that protruding portions are provided at a top plate side and a recessed portion is provided at each of a first flange portion side and a second flange portion side. The remaining configuration is the same as that of the first embodiment, so like reference numerals are assigned, and the description thereof is omitted.

As shown in FIG. 9, a protruding portion P having a convex shape and convex toward a first flange portion 11A when viewed in the axis AX direction is provided on a top plate 15A-side second facing surface 15*f*1. A recessed portion C having a concave shape and complementing the convex shape of the protruding portion P of the top plate 15A is provided on a first flange portion 11A-side first facing surface 11*f*. Similarly, at the second flange portion side, a protruding portion P having a convex shape and convex toward the second flange portion when viewed in the axis AX direction is provided on a top plate 15A-side second facing surface, and a recessed portion C having a concave shape and complementing the convex shape of the protruding portion P of the top plate 15A is provided on a second flange portion-side first facing surface.

With the above configuration, since the convex shape of each of the protruding portions P provided in the top plate 15A complements the concave shape of the recessed portion C provided in each of the first flange portion 11A and the second flange portion, a distance between the top plate 15A-side second facing surface and the first flange portion 11A-side first facing surface and a distance between the top plate 15A-side second facing surface and the second flange portion-side first facing surface are reduced as compared to when the core having a protruding portion on each of the upper surface of the first flange portion 11A and the upper surface of the second flange portion is combined with the top plate having a flat bottom surface. As a result, magnetic reluctance that is generated by a space between the top plate 15A-side second facing surface and the first flange portion 11A-side first facing surface and a space between the top plate 15A-side second facing surface and the second flange portion-side first facing surface are reduced, with the result that coil characteristics are improved.

The present disclosure is not limited to the above-described embodiments, and the design may be changed without departing from the scope of the present disclosure.

In the above-described embodiments, the coil component includes two wires. Alternatively, the coil component may include one or three or more wires. In the above-described embodiments, the coil component is used as a common mode choke coil. Alternatively, the coil component may be used as, for example, a wire-wound coil in which a wire is wound around a core portion, such as a transformer and a coupling inductor.

In the first embodiment, the protruding portion is provided at each of the first flange portion and the second flange portion. Alternatively, the protruding portion may be provided at only any one of the first flange portion and the second flange portion. In this case, the recessed portion just needs to be provided at least on a facing surface facing the upper surface of the flange portion provided with the protruding portion in the bottom surface of the top plate. Similarly, in the second embodiment, the recessed portion is provided at each of the first flange portion and the second flange portion. Alternatively, the recessed portion may be provided at only any one of the first flange portion and the second flange portion. In this case, the protruding portion just needs to be provided at least on a facing surface facing the upper surface of the flange portion provided with the recessed portion in the bottom surface of the top plate.

In the first embodiment, in the cross section orthogonal to the axial direction and intersecting with the first flange portion, the topmost part of the inner surface of the recessed portion, the topmost part of the protruding portion, and both end parts of the recessed portion in a direction parallel to the top surface of the top plate are arranged in this order from the top plate side. Alternatively, (i) the topmost part of the inner surface of the recessed portion, (ii) the topmost part of the protruding portion, and (iii) any one of both end parts of the recessed portion in a direction parallel to the top surface of the top plate may be arranged in this order from the top plate side.

In the first embodiment, the bottom surface of the top plate has a cutout at both end parts in a direction orthogonal to the axial direction and parallel to the top surface of the top plate. Alternatively, the bottom surface of the top plate may have a cutout only at any one of both end parts in a direction orthogonal to the axial direction and parallel to the top surface of the top plate.

<1> A coil component includes a core having a core portion extending in an axial direction, and a first flange portion and a second flange portion respectively provided at both ends of the core portion in the axial direction, a coil wound around the core portion, and a top plate provided so as to span between the first flange portion and the second flange portion. The first flange portion has a first facing surface facing the top plate, the top plate has a second facing surface facing the first flange portion, and, in a cross section that is orthogonal to the axial direction and that intersects with the first flange portion, a protruding portion having a convex shape and convex toward the top plate is provided on the first facing surface, and a recessed portion having a concave shape and complementing the convex shape of the protruding portion of the first flange portion is provided on the second facing surface.

<2> In the coil component according to <1>, the top plate has a top surface on an opposite side to the second facing surface, and in the cross section, a topmost part of the protruding portion of the first flange portion is disposed at a center of the first flange portion in a direction parallel to the top surface of the top plate.

<3> In the coil component according to <1> or <2>, the top plate has a top surface on an opposite side to the second facing surface, and in the cross section, where a direction from the core toward the top plate is an upper side, (i) a topmost part of an inner surface of the recessed portion, (ii) a topmost part of the protruding portion, and (iii) at least one of both end parts of the recessed portion in a direction parallel to the top surface of the top plate are disposed in this order from the top plate side.

<4> In the coil component according to any one of <1> to <3>, the top plate has a top surface on an opposite side to the second facing surface. When viewed in a direction orthogonal to the axial direction and orthogonal to the top surface of the top plate, the protruding portion and the recessed portion, respectively, have regions that are parts overlapping each other, and in the cross section, a distance between the protruding portion and the recessed portion at each of both end parts of each of the regions that are the overlapping parts in a direction parallel to the top surface of the top plate is greater than a distance between the protruding portion and the recessed portion at a center of each of the regions that are the overlapping parts in the direction parallel to the top surface of the top plate.

<5> In the coil component according to any one of <1> to <4>, the top plate has a top surface on an opposite side to the second facing surface, and a bottom surface on an opposite side to the top surface and having the second facing surface, and the bottom surface of the top plate has a cutout in at least one of both end parts in a direction orthogonal to the axial direction and parallel to the top surface of the top plate.

<6> In the coil component according to <5>, in the cross section, where a direction from the core toward the top plate is an upper side, a topmost part of an inner surface of the cutout, a topmost part of an inner surface of the recessed portion, a topmost part of the protruding portion, and one or both end parts of the recessed portion, provided with the cutout, in a direction parallel to the top surface of the top plate are disposed in this order from the top plate side.

<7> In the coil component according to <5> or <6>, when viewed in a direction orthogonal to the top surface of the top plate, the cutout overlaps the protruding portion of the first flange portion.

<8> In the coil component according to any one of <1> to <7>, the top plate has a top surface on an opposite side to the second facing surface, and a bottom surface on an opposite side to the top surface and having the second facing surface, and the recessed portion of the top plate extends to a region overlapping the core portion in the bottom surface of the top plate when viewed in a direction orthogonal to the axial direction and orthogonal to the top surface of the top plate.

<9> In the coil component according to any one of <1> to <8>, in the cross section, a radius of curvature of the recessed portion of the top plate is greater than a radius of curvature of the protruding portion of the first flange portion.

<10> In the coil component according to any one of <1> to <9>, in the cross section, a center of a circle of curvature of the recessed portion of the top plate is located outside the first flange portion.

<11> In the coil component according to any one of <1> to <10>, in the cross section, a center of a circle of curvature of the protruding portion of the first flange portion is located outside the first flange portion.

<12> The coil component according to any one of <1> to <11> further includes an adhesive bonding the core with the top plate, wherein the adhesive contains magnetic particles.

<13> A manufacturing method for a coil component includes forming a core having a protruding portion in a first flange portion by forming a core molded body through first press molding of a core material and then firing the core molded body, forming a top plate having a recessed portion by forming a top plate molded body through second press molding of a top plate material and then firing the top plate molded body, winding a coil around a core portion of the core, and combining the top plate with the core in which the coil is wound.

<14> In the manufacturing method according to <13>, the first press molding is to compress the core molded body with an upper punch and a lower punch.

<15> In the manufacturing method according to <13> or <14>, the second press molding is to compress the top plate molded body with an upper punch and a lower punch.

<16> A coil component includes a core having a core portion extending in an axial direction, and a first flange portion and a second flange portion respectively provided at both ends of the core portion in the axial direction, a coil wound around the core portion, and a top plate provided so as to span between the first flange portion and the second flange portion. The first flange portion has a first facing surface facing the top plate, the top plate has a second facing surface facing the first flange portion. Also, in a cross section that is orthogonal to the axial direction and that intersects with the first flange portion, a protruding portion having a convex shape and convex toward the first flange portion when viewed in the axial direction is provided on the second facing surface, and a recessed portion having a concave shape and complementing the convex shape of the protruding portion of the top plate is provided on the first facing surface.

What is claimed is:

1. A coil component comprising:

a core having a core portion extending in an axial direction, and a first flange portion and a second flange portion respectively disposed at both ends of the core portion in the axial direction;

a coil wound around the core portion; and a top plate which spans between the first flange portion and the second flange portion, wherein the first flange portion has a first facing surface facing the top plate, the top plate has a second facing surface facing the first flange portion, in a cross section that is orthogonal to the axial direction and that intersects with the first flange portion, a protruding portion having a convex shape and convex toward the top plate is on the first facing surface, and having a first center and first end parts spaced from the first center, a recessed portion having a concave shape and complementing the convex shape of the protruding portion of the first flange portion is on the second facing surface, and having a second center and second end parts spaced from the second center, and in the cross section, a distance between the first end parts and the second end parts is greater than a distance between the first center and the second center.

2. The coil component according to claim 1, wherein the top plate has a top surface on an opposite side to the second facing surface, and in the cross section, a topmost part of the protruding portion of the first flange portion is at a center of the first flange portion in a direction parallel to the top surface of the top plate.

3. The coil component according to claim 1, wherein the top plate has a top surface on an opposite side to the second facing surface, and in the cross section, where a direction from the core toward the top plate is an upper side, a topmost part of an inner surface of the recessed portion, a topmost part of the protruding portion, and at least one of both second end parts of the recessed portion in a direction parallel to the top surface of the top plate are disposed in this order from the top plate side.

4. The coil component according to claim 1, wherein the top plate has a top surface on an opposite side to the second facing surface, when viewed in a direction orthogonal to the axial direction and orthogonal to the top surface of the top plate, the protruding portion and the recessed portion, respectively, have regions that are parts overlapping each other.

5. The coil component according to claim 1, wherein the top plate has a top surface on an opposite side to the second facing surface, and a bottom surface on an opposite side to the top surface and having the second facing surface, and the bottom surface of the top plate has a cutout in at least one of both second end parts in a direction orthogonal to the axial direction and parallel to the top surface of the top plate.

6. The coil component according to claim 5, wherein in the cross section, where a direction from the core toward the top plate is an upper side, a topmost part of an inner surface of the cutout, a topmost part of an inner surface of the recessed portion, a topmost part of the protruding portion, and one or both second end parts of the recessed portion, having the cutout, in a direction parallel to the top surface of the top plate, are disposed in this order from the top plate side.

7. The coil component according to claim 5, wherein when viewed in a direction orthogonal to the top surface of the top plate, the cutout overlaps the protruding portion of the first flange portion.

8. The coil component according to claim 1, wherein the top plate has a top surface on an opposite side to the second facing surface, and a bottom surface on an opposite side to the top surface and having the second facing surface, and the recessed portion of the top plate extends to a region overlapping the core portion in the bottom surface of the top plate when viewed in a direction orthogonal to the top surface of the top plate.

9. The coil component according to claim 1, wherein in the cross section, a radius of curvature of the recessed portion of the top plate is greater than a radius of curvature of the protruding portion of the first flange portion.

10. The coil component according to claim 1, wherein in the cross section, a center of a circle of curvature of the recessed portion of the top plate is located outside the first flange portion.

11. The coil component according to claim 1, wherein in the cross section, a center of a circle of curvature of the protruding portion of the first flange portion is located outside the first flange portion.

12. The coil component according to claim 1, further comprising:

an adhesive bonding the core with the top plate, wherein the adhesive contains magnetic particles.

13. The coil component according to claim 2, wherein the top plate has a top surface on an opposite side to the second facing surface, and in the cross section, where a direction from the core toward the top plate is an upper side, a topmost part of an inner surface of the recessed portion, a topmost part of the protruding portion, and at least one of both second end parts of the recessed portion in a direction parallel to the top surface of the top plate are disposed in this order from the top plate side.

14. The coil component according to claim 2, wherein the top plate has a top surface on an opposite side to the second facing surface, when viewed in a direction orthogonal to the axial direction and orthogonal to the top surface of the top plate, the protruding portion and the recessed portion, respectively, have regions that are parts overlapping each other.

15. The coil component according to claim 2, wherein the top plate has a top surface on an opposite side to the second facing surface, and a bottom surface on an opposite side to the top surface and having the second facing surface, and the bottom surface of the top plate has a cutout in at least one of both second end parts in a direction orthogonal to the axial direction and parallel to the top surface of the top plate.

16. A manufacturing method for a coil component, the manufacturing method comprising:

forming a core having a protruding portion in a first flange portion by forming a core molded body through first press molding of a core material and then firing the core molded body, wherein the protruding portion has a first center and first ends spaced from the first center;

forming a top plate having a recessed portion by forming a top plate molded body through second press molding of a top plate material and then firing the top plate molded body, wherein the recessed portion has a second center and second end parts spaced from the second center;

winding a coil around a core portion of the core; and combining the top plate with the core in which the coil is wound, wherein, after combining the top plate with the core, in a cross section, a distance between the first end parts and the second end parts is greater than a distance between the first center and the second center.

17. The manufacturing method according to claim 16, wherein the first press molding is to compress the core molded body with an upper punch and a lower punch.

18. The manufacturing method according to claim 16, wherein the second press molding is to compress the top plate molded body with an upper punch and a lower punch.

19. The manufacturing method according to claim 17, wherein the second press molding is to compress the top plate molded body with an upper punch and a lower punch.

20. A coil component comprising:

a core having a core portion extending in an axial direction, and a first flange portion and a second flange portion respectively disposed at both ends of the core portion in the axial direction;

a coil wound around the core portion; and a top plate which spans between the first flange portion and the second flange portion, wherein the first flange portion has a first facing surface facing the top plate, the top plate has a second facing surface facing the first flange portion, in a cross section that is orthogonal to the axial direction and that intersects with the first flange portion, a protruding portion having a convex shape and convex toward the first flange portion when viewed in the axial direction is on the second facing surface, and having a first center and first end parts spaced from the first center, a recessed portion having a concave shape and complementing the convex shape of the protruding portion of the top plate is on the first facing surface, and having a second center and second end parts spaced from the second center, and a distance between the first end parts and the second end parts is greater than a distance between the first center and the second center.

* * * * *